United States Patent [19]
Levin et al.

[11] Patent Number: 6,023,380
[45] Date of Patent: Feb. 8, 2000

[54] TWO PIECE CURVED PROJECTION LENS METHOD AND APPARATUS

[75] Inventors: Rod J. Levin, Palatine; Robert Schmidt, Chicago, both of Ill.

[73] Assignee: Zenith Electronics Corporation, Glenview, Ill.

[21] Appl. No.: 09/158,243

[22] Filed: Sep. 22, 1998

[51] Int. Cl.[7] ...................................................... G02B 7/02

[52] U.S. Cl. ............................................................ 359/819

[58] Field of Search .................................. 359/819, 811, 359/821, 451

[56] References Cited

U.S. PATENT DOCUMENTS

| | | | |
|---|---|---|---|
| 4,767,186 | 8/1988 | Bradley et al. | 359/452 |
| 4,921,330 | 5/1990 | Takahashi et al. | 359/457 |
| 5,400,177 | 3/1995 | Petitto et al. | 359/451 |

*Primary Examiner*—Georgia Epps
*Assistant Examiner*—Ricky Mack

[57] ABSTRACT

A two piece plastic lens for a large screen projection system in which the two lens elements are formed with similar curves. The lens is supported at its peripheral edge by a flexible strip having a T-cross section that fits into a matching groove in a frame or on the housing. The curved lens elements tend not to separate with temperature changes and the like and focus and display quality are maintained.

11 Claims, 1 Drawing Sheet

TWO PIECE CURVED PROJECTION LENS METHOD AND APPARATUS

BACKGROUND OF THE INVENTION AND PRIOR ART

This invention relates generally to large screen projection lenses for television receiver and monitor displays and particularly to large screen projection lenses that are made up of two separate elements, such as a fresnel lens and a lenticular lens.

It is common practice with large screen projection systems to include a plastic lens system consisting of a planar fresnel lens and a planar lenticular lens that are supported in full surface contact with each other. Difficulties often arise due to temperature changes, mechanical problems and the like where one of the lens elements departs from its flat configuration and separates from the other lens element. This can result in local screen imperfections such as distortion, defocusing and color impurities, all of which are very disturbing to a viewer. With the present invention, a similar curve is imparted to both of the lens elements and consequently, they tend to stay together during temperature cycling and despite minor mechanical imperfections in the lens elements and their supporting structure. Hence a more reliable large screen projection lens is produced with the invention.

The curve that is imparted may be cylindrical, spherical parabolic, etc., depending upon the design environment. Should correction of the images be required as a result of the curved screen configuration, well-known waveform correction circuitry may be employed for this purpose. It is also anticipated that the type of screen curve configuration used may alleviate the display geometry problems in the receiver and lead to simpler implementations.

In addition to the curved configuration of the lens elements, the invention includes a novel mounting arrangement for the lens. Essentially, a flexible strip having a T-shaped cross section is used in conjunction with a groove in a frame or housing of matching contour for securing the two lens elements in position. The mounting arrangement is simple and effective and the leg of the T-shaped flexible strip also serves to provide a covering for the edges of the two lens elements.

OBJECTS OF THE INVENTION

A principal object of the invention is to provide a novel large screen projection lens.

Another object of the invention is to provide an improved method and apparatus for a large screen projection lens.

A further object of the invention is to provide an improved large screen projection lens and method of mounting.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
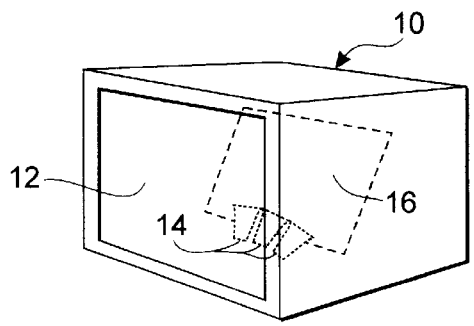
FIG. 1 depicts a television receiver incorporating a prior art projection lens.
Figure 2:
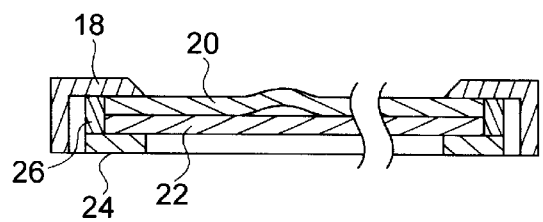
FIG. 2 is a cross section of a prior art projection lens exemplifying the problem solved by the invention.

Referring to FIG. 1 of the drawings, a television receiver or monitor housing 10 includes a projection lens 12 constructed in accordance with the prior art. Three color cathode ray tubes 14 are arranged to project a red, blue and green color image upon a large angled mirror 16, which reflects the unified color image to lens 12. As seen in FIG. 2, lens 12 consists of two planar lens elements 20 and 22 that are secured at their edges by a frame 18, a rail 24 and an upright support 26. As illustrated in an exaggerated manner, lens element 20 is bulged outwardly and is no longer in contact with lens 22 over its entire surface. This results in image distortion, which is highly objectionable to a viewer.

Figure 3:
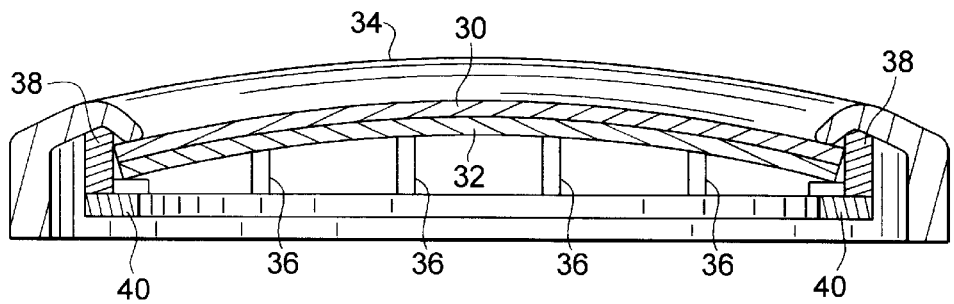
FIG. 3 is a cross section of a projection lens constructed in accordance with the invention.

In FIG. 3, the inventive construction for the two lens elements is seen to involve imparting a curve to both elements. The curved surfaces tend to stay in contact with each other under temperature variations and various mechanical stresses. The upper lens element 30 may be a lenticular lens and the lower lens element 32 may be a fresnel lens. Both these lenses are well-known in the art and need no further description. A support frame 34 is configured to follow the contour of the lens elements 30 and 32. Similarly, a rail 40 includes a plurality of upstanding ribs 36 that provide support for the lens elements in spanning the viewing opening in the television receiver or projection monitor housing. A surrounding upright element 38 completes the assembly. It is also customary to apply tape around the periphery of the lens elements to assist in keeping them together and to minimize the intrusion of dust or other material.

Figure 4:
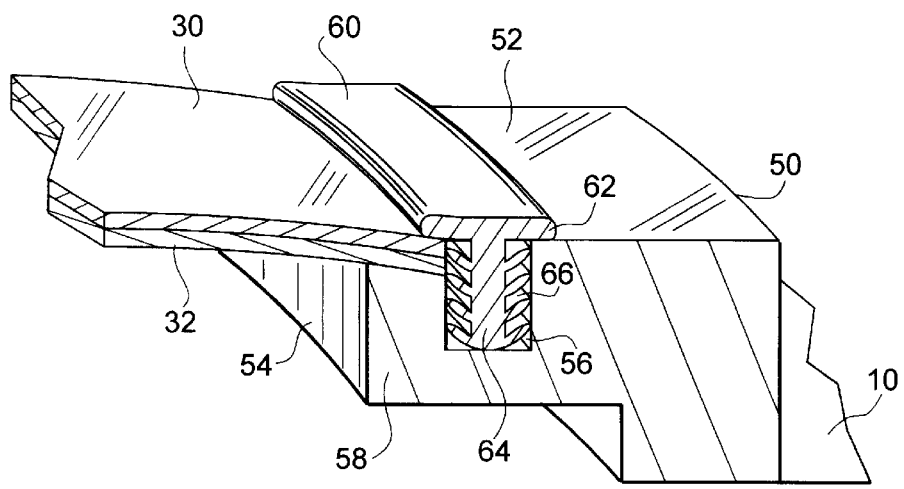
FIG. 4 is a partial perspective view illustrating the novel mounting arrangement for the projection lens of the invention.

FIG. 4 illustrates a novel technique for mounting the lens elements to a frame (or directly to the housing). In this embodiment, a frame 50 includes a surface 52 that is formed to have substantially the same contour as the lens elements 30 and 32. A groove 56 is formed in surface 52 adjacent to inner frame edge 54 that is adjacent to the viewing opening. Groove 56 is configured to follow the periphery of the lens elements. A flexible mounting strip 60 that has a T-shaped cross section secures the lens arrangement to frame 50. Mounting strip 60 has a cap 62 and a depending leg portion 64 that includes a plurality of flexible extensions 66 in a tree-like configuration. This type of mounting strip is known for securing automobile windshields in the prior art, but has not been used in the manner disclosed to secure a multi element projection lens arrangement to a frame. The inner wall of groove 56 is undercut at 58 by an amount that is equal to the combined thickness of lens elements 30 and 32. This enables cap 60 to securely hold the lens arrangement in place on frame 50.

It will be appreciated by those skilled in the art that the groove may be formed directly in a surface of housing 10, dispensing with the need for a separate frame 50. In such case, cap 62 will be designed to present a finished appearance to maintain the esthetic appeal of the television receiver or monitor housing. It should also be noted that the contour of the lens elements is not critical to the invention, only that they have some curve to their surfaces. Ideally, the contours are the same to provide for intimate surface contact between the lens elements.

What has been described is a novel lens arrangement for a projection screen. It is recognized that numerous changes to the described embodiment of the invention will be apparent to those skilled in the art without departing from its true spirit and scope. The invention is to be limited only as defined in the claims.

What is claimed is:

1. A method of fabricating a lens for a large screen projection viewing system comprising:

providing two plastic lens elements;

imparting similar curved configurations to the two lens elements to enable a position where the two lens elements are in intimate full surface contact with each other;

positioning the two lens elements in the intimate surface contact position;

supporting the two positioned lens elements at their edges to span the large viewing screen opening in a housing;

conforming the large viewing screen opening to match the periphery and the curved configuration of the two lens elements;

providing a groove in the housing, approximating the periphery of the two lens elements, adjacent to the large viewing screen opening; and supporting the two lens elements with a T-shaped retaining element that engages the edge of the outer lens element the housing and the groove.

2. The method of claim 1, further comprising:

undercutting the groove wall of the housing adjacent to the two lens elements by an amount substantially equal to the thickness of the two lens elements; and securing the edge of the outer lens element and the non undercut portion of the housing under the cap of the T-shaped retaining element.

3. The method of claim 2, further comprising covering the edges of the two lens elements.

4. The method of claim 3, wherein the T-shaped retaining element comprises a flexible strip that covers the edges of the lens elements.

5. A lens for a large screen projection viewing system comprising:

a housing having a large viewing screen opening:

first and second plastic lens elements having a similar curved contour and edge periphery for enabling a position where said two lens elements are in intimate full surface contact with each other;

edge supports for supporting said positioned plastic lens elements, in intimate full surface contact with each other, at said edge periphery so as to span said large viewing screen opening in said housing;

said edge supports forming a surface adjacent said viewing screen opening that matches said curved contour and edge periphery of said lens elements;

said surface including a groove that approximates said edge periphery of said lens elements; and a T-shaped support engaging said edge periphery of said lens elements, said housing and said groove for supporting said lens elements in spanning said large viewing opening.

6. The lens of claim 5, wherein:

the wall of said groove adjacent to said large viewing screen opening is undercut by an amount substantially equal to the combined thickness of said first and second lens elements, and wherein;

said T-shaped support includes a cap that engages the outer edge of said first lens element and said surface that defines the opposite wall of said groove.

7. The lens of claim 6, wherein said first lens element comprises a lenticular lens and said second lens element comprises a fresnel lens and further including:

a cover for covering said edges of said lens elements.

8. The lens of claim 7, wherein said T-shaped support comprises a flexible strip having a T-shaped cross section, and wherein said cover comprises the leg portion of said flexible strip.

9. The lens of claim 5, wherein:

the wall of said groove that is adjacent to said large viewing screen opening is undercut by an amount substantially equal to the combined thickness of said first and second lens elements, and wherein;

said T-shaped support includes a cap that engages the outer edge of said first lens element and the surface of said housing that defines the opposite wall of said groove.

10. The lens of claim 9, wherein said first lens element comprises a lenticular lens and said second lens element comprises a fresnel lens and further including:

a cover for covering said edges of said lens elements.

11. The lens of claim 10, wherein said T-shaped support comprises a flexible strip having a T-shaped cross section, and wherein said cover comprises the leg portion of said flexible strip.

* * * * *